Sept. 8, 1953        S. E. GARUTSO        2,651,238

DEEP FOCUS PHOTOGRAPHIC OBJECTIVE

Filed March 1, 1948

Stephen E. Garutso,
INVENTOR.

BY Robert W. Fulwider
ATTORNEY.

Patented Sept. 8, 1953

2,651,238

UNITED STATES PATENT OFFICE 2,651,238

DEEP FOCUS PHOTOGRAPHIC OBJECTIVE

Stephen E. Garutso, San Fernando, Calif., assignor, by mesne assignments, to Balanscope, Inc., a corporation of California Application March 1, 1948, Serial No. 12,275

6 Claims. (Cl. 88—57)

My invention relates generally to photographic objectives and more particularly to such lens systems which are adapted to produce a relatively great depth of field while having a relatively wide aperture.

The usual definition of "depth of field" and that which will be adhered to herein is: the depth along the optical axis of the field of view of an objective, in which objects are focused to an acceptable degree of sharpness.

The principal factors influencing the depth of field are: (1) the focal length of the objective, (2) the speed or aperture size of the objective, (3) the object distance to the plane upon which the objective is critically focused, (4) the permissible diameter of the circle of confusion in the photographed image, (5) the amount of spherical aberration and to some extent other aberrations which are present in the objective.

In most photographic applications, such as motion picture photography, telecasting, and the like, certain of the above factors are dictated by considerations other than depth of field. For example, when a certain angle of field is required, the focal length of the objective used is established. Likewise, the permissible diameter of the circle of confusion in the image can be considered as predetermined, in such fields as motion picture photography. Still further, lighting conditions often impose the necessity of a relatively wide aperture.

The above limitations imposed upon the conventional photographic objective have, to a large extent, controlled the practices in motion picture photography and in television broadcasting. It is usually necessary, where artificial lighting is used, to so arrange the scene that the actors are relatively close to the background against which they appear, so that when the lens is open to its greatest aperture, as it must be under such lighting conditions, both the actors and the background will be in reasonably sharp focus. An alternative practice is to so position the actors with respect to the background that the background objects are completely out of focus.

It has been found, however, that highly desirable scenic effects can be produced by the use of photographic objectives having a relatively great depth of field. With such objectives, scenes can be made in which relatively widely spaced background and foreground objects are in relatively sharp focus or in which an actor may move toward the camera and remain in focus without the necessity of racking the lens forward as the actor moves to the foreground. In the past, however, such scenes have only been possible where the lighting is sufficiently intense to enable stopping the lens down to a relatively small aperture.

According to the most widely accepted theory of image formation, the depth of field of an optical objective varies inversely as the approximate square of the aperture. Thus, for example, if a lens having an aperture of 10 millimeter diameter has a depth of field between the nearest and furtherest objects in sharp focus, of, for example, three to twelve feet, the same lens opened to an aperture diameter of 20 millimeters will have a depth of field of from approximately four to approximately seven feet.

Another extremely important factor to consider when correcting an objective for depth of field is the effect of spherical aberration. In conventional photographic objectives, the presence of a certain amount of spherical aberration is sometimes said to increase the apparent depth of field. Actually the depth of field is not increased by spherical aberration, but is actually decreased thereby. The apparent increase in depth of field is due to the fact that when spherical aberration is present and the aperture is opened to a substantial diameter, there is no discernable plane of critical focus, in other words, all objects are at least slightly out of focus. This is due to the fact that the marginal rays of the objective do not focus at the same point as rays closely adjacent the axis. Thus since all objects are somewhat blurred, the theoretical zone of critical focus cannot be delimited.

It is customary practice in the design of photographic objectives to make the corrections for spherical aberration take effect principally in the central zones of the lens, allowing the correction to be somewhat less in the zone at the margin of the lens. The reason for this type of correction is that, in the usual practice, when the lens is opened to its fullest aperture, the depth of field is so reduced that it becomes of no further advantage to correct for spherical aberration. Were it possible to design lenses having aspherically surfaced elements so that the correction of spherical aberration took place over the entire area of the objective, then of course, it would probably be the usual practice to apply a correction equally over the entire area. However, the correction of spherical aberration is achieved by combining a positive lens having spherical undercorrection with a negative lens having spherical over-correction whereby these corrections tend to neutralize each other, greatly reducing the spherical aberration in the resultant combination and producing what is called an aplanatic objective.

Since the shapes of the curves of under-correction in a positive lens and of over-correction in a negative lens are not the same, the result of combining two such lenses is never to completely eliminate spherical aberration, but is a compromise. Thus even the highest grade of photographic objectives still retains some spherical aberration. As has been previously stated, the correction is usually so applied as to leave such vestigial spherical aberration in the extreme marginal areas of the objective.

The present application is a continuation in part of my previous application, Serial No. 581,382, on an Optical Balancing Assembly, filed March 7, 1945, now abandoned, and my previous application, Serial No. 624,501, on an Optical Balance Assembly, filed October 25, 1945, now Patent No. 2,550,685, issued May 1, 1951. In the aforesaid previous applications, a lens system was disclosed in which annular lens elements, which I have termed balancing elements, are placed in combination with a conventional photographic objective whereby to increase the depth of field thereof. Briefly stated, the theory upon which a photographic objective may be so balanced or corrected for depth of field is as follows.

The conventional photographic objective having the annular balancing elements placed coaxially therewith so as to modify the focal length of a part of the conventional lens, may be considered as producing two axially spaced images of each of the objects viewed by the modified objective. One of each of said two images is produced by the unaffected central area of the conventional objective acting alone, and the other of such pair is produced by the conventional objective acting in combination with the annular balancing element. Thus, if a scene having a foreground object and a background object is viewed with an objective corrected in the manner just described, a total of four images may be considered to exist. These four images comprise a pair of images of the foreground object and a pair of images of the background object. If arrangement of the elements and their focal lengths are, furthermore, such that two of these four images are coincident in a certain focal plane, then a photographic plate placed in said plane of coincidence will receive a composite image in which both the foreground and background objects are relatively sharp. Still further, if the elements are properly selected, the remaining two images of the four previously listed will be far enough from the plane of coincidence so as to produce no discernable double image or other undesirable distortion in the composite image.

So much of the theory of optical balance as has just been described is disclosed in my aforementioned, previous patent applications. In addition to the basic theory of optical balance, however, I have found that it is necessary to take into consideration the effect of spherical aberration. It will be noted, for example, that if in placing an annular balancing element in combination with a conventional lens as just described, the spherical aberration in the marginal zone is increased, or even left "as is," the effect of such spherical aberration on the composite image above described will be such as to overcome the advantage gained by optical balance in that the image produced will have no substantial plane of critical focus, let alone any appreciable depth of field.

Thus, it will be seen that to obtain the advantages of optical balance for increased depth of field, it is necessary that the correction applied for this purpose also operate to reduce spherical aberration in the marginal zone of the objective corrected.

Bearing in mind the foregoing desiderata, it is a major object of my invention to provide optical means for correcting a conventional photographic objective by the use of which both the increase in depth of field and the reduction of marginal spherical aberration may be accomplished.

It is another object of my invention to provide means for correcting spherical aberration which means may be positioned to operate selectively on specific zones of said objective.

It is still another object of my invention to provide a corrective element for reducing spherical aberration which does not require aspherical surfaces.

The foregoing and other objects and advantages of my invention will become apparent from the following detailed description of a specific embodiment thereof, such description being illustrated by accompanying drawings, in which.

Figure 1:
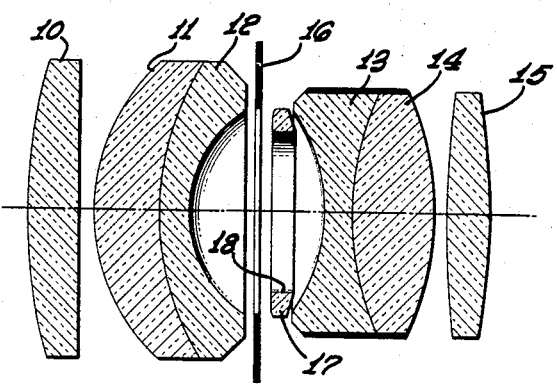
Figure 1 is an axial section of a conventional photographic objective, having added thereto a balancing element in accordance with my invention.

In Figure 1 the conventional photographic objective in which my balancing lens is employed is a Cook 35 millimeter focal length F/2 motion picture objective, having elements of the approximate shape and disposition shown in the drawings. Since the optical constants of the conventional elements of the lens assembly are not important to the present invention, they are not given herein.

The conventional lens assembly comprised of the elements 10 through 15, inclusive, is provided with a conventional iris diaphragm stop 16 located at the approximate center of the optical elements as shown. In the drawings, the stop 16 is represented as open to its fullest extent, i. e., in the neighborhood of 12½ millimeters. The plano-convex lens 10 is the foremost element in the conventional objective and thus, as illustrated herein, objects viewed by the lens would be to the left in Figure 1, while the photographic plate or film would be to the right. The elements 10 through 15 are mounted in a conventional lens mount which is omitted from the drawings in order to clearly illustrate the optical elements therein.

Immediately to the rear of the stop 16 and coaxial with the conventional elements is mounted a balancing element 17 constructed according to my invention. This element 17 is a plano-convex lens having a refractive index of 1.523 and having a power of plus 20 diopters. As can be readily seen in the drawings, a substantial circular portion of the center of the balancing element 17 is cut away as indicated by the reference character 18, leaving an annular element. The diameter of the cut-away central portion is 10 millimeters, the external diameter of the element 17 being 12½ millimeters.

Thus it will be seen that the proportion of light intercepted by the element 17 is determined by the ratio of its annular area to the area of the pupil within the stop 16. This ratio, it will be seen, is approximately .39 or about 40%. The figure 40% represents a maximum percentage of area that can be intercepted by an annular balancing element such as 17 without producing a double image effect, and it has been found further that this percentage can be reduced to 28% and still give a pronounced improvement in depth of field. Thus, taking the figures 28% and 40% as a minimum and maximum respectively for the particular conventional lens illustrated, an average figure of 34% is obtained, giving a latitude of plus or minus 6% in the ratio of areas within which effective balancing and aberration correction can be achieved without double image effects. The significance and importance of this critical percentage will appear from the following discussion of spherical aberration.

Before proceeding to a discussion of the correction of spherical aberration, the following tabular data are given to illustrate the improvement resulting from the arrangement illustrated in Figure 1. The conventional lens portion of the system illustrated in Figure 1 is mounted in a focusing mount having eleven sequential positions or steps. The depth of field at each of these step settings is given in the following table, being represented as the distances to the nearest and farthest object in acceptably sharp focus.

*Conventional lens*

| Step Setting | Depth of Field in Feet |
| --- | --- |
| 1 | 3 to 4 |
| 2 | 4 to 5 |
| 3 | 5 to 6 |
| 4 | 6 to 7 |
| 5 | 7 to 8 |
| 6 | 8 to 10 |
| 7 | 10 to 12 |
| 8 | 12 to 15 |
| 9 | 15 to 25 |
| 10 | 25 to 50 |
| 11 | 50 to ∞ |

After incorporating the balancing elements 17 the total range of focusing represented in the above table is accomplished in three step settings instead of eleven. These settings produce depths of field as follows:

*Balanced lens*

| Step Setting | Depth of Field in Feet |
| --- | --- |
| 1 | 3 to 5 |
| 2 | 5 to 15 |
| 3 | 8 to ∞ |

The advantages of the balanced lens system will be apparent to those skilled in the art. For example, it will be noted that with a conventional lens balanced according to my invention, all objects farther than eight feet may be brought into simultaneous acceptable focus whereas in the conventional lens without the balancing elements, simultaneous acceptable focus can be obtained only of objects between fifty feet and infinity.

Furthermore, due to a substantial reduction in spherical aberration, as will be described later herein, the contrast and plasticity in images produced with the balanced system is very noticeably improved over images produced with the "wide-open" conventional lens without the balancing element.

Figure 2:
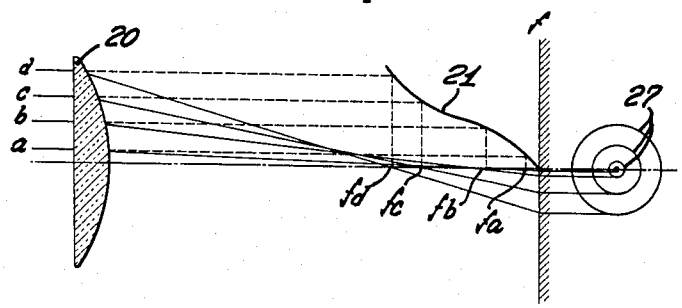
Figure 2 is a semi-schematic elevational section of a simple plano-convex lens showing the graphic representation of spherical aberration therein.

Referring now to Figure 2, it will be seen that I have illustrated the conventional graphic representation of spherical aberration. A plano-convex spherical lens 20 is shown in Figure 2, having a theoretical focal plane $f$ being the focal plane of paraxial rays. Parallel rays $a$, $b$, $c$ and $d$ are shown entering the lens 20 from the left. If all of the rays $a$–$d$ were bent according to the Gauss theory, they would all intercept the optical axis at the point where the latter intersects the paraxial focal plane $f$. It will be noted, however, that the bending of the axial ray $a$ is considerably less than the bending of the marginal ray $d$, wherefore the focal points, i. e., the points at which the rays intersect the optical axis, are distributed along the axis at points $f_a$, $f_b$, $f_c$ and $f_d$, as shown in Figure 2.

The curve of spherical aberration is indicated by the reference character 21, and is the curve having ordinates equal to the heights of the various rays above the optical axis and abscissae equal to the distance along the optical axis at which the particular ray intercepts the same. Due to the fact that the convex surface of the lens 20 is a surface of revolution about the optical axis, each of the rays $a$–$d$ illustrates the bending of a circle of rays equidistant from the optical axis. This circle can and will herein be considered as an incremental zone having an effective radius of the particular ray illustrated ($a$, $b$, $c$ or $d$).

One of the significant features of the curve of aberration 21 is that it shows the position at which a photographic plate must be placed in order to bring any particular incremental zone of rays into sharp focus. Thus, for example, if the photographic plate is placed at the points $f_c$ in Figure 2, then objects at infinity will be sharply focused by a narrow zone having an effective radius equal to the height of the ray $c$ above the optical axis. All of the other rays entering the lens 20 will fail to fall at a sharp focal point and will produce a blur or halo around the image produced. The width or extent of this blur is usually referred to as the circle of confusion.

If a photographic plate were to be placed at the theoretical focal distance $f$ in Figure 2, then the rays $a$, $b$, $c$ and $d$ would produce circles of confusion, the relative diameters of which are indicated by the concentric circles 27 to the right in Figure 2.

The spherical aberration curve 21, as shown in Figure 2, is of course a severe case shown for illustrative purposes only, and far greater than that obtained in conventional corrected objectives. The correction of spherical aberration is accomplished by combining positive lenses such as the plano-convex lens 20 in Figure 2 with negative lenses. A positive lens having a curve of under-correction similar to the curve 21 in Figure 2 and negative lenses having characteristic curves of over-correction which slant in the opposite direction, the two lenses when combined tend to neutralize each other, and to a large extent, the spherical aberration is removed from the combination.

Figures 3, 4, 5:
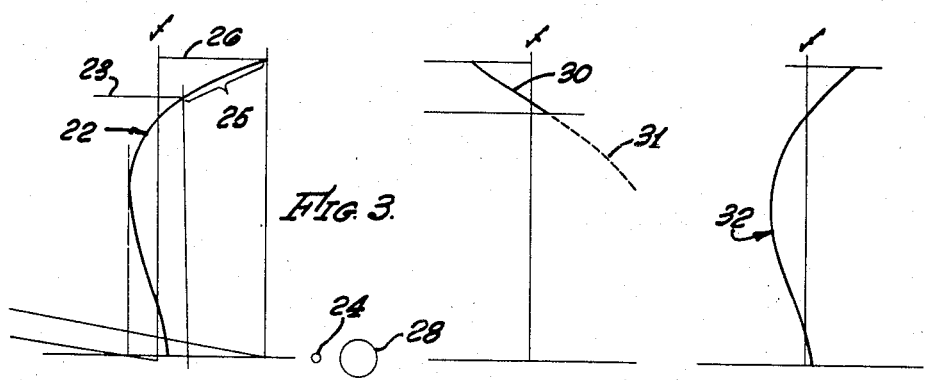
Figure 3 is a typical spherical aberration curve of a conventional photographic objective.
Figure 4 is the spherical aberration curve of a balancing element employed in the lens assembly illustrated in Figure 1.
Figure 5 is the spherical aberration curve of the conventional portions of the lens assembly illustrated in Figure 1.

A typical spherical aberration curve of a conventional corrected photographic objective is illustrated in Figure 3, and indicated by the reference character 22. A focal plane $f$ has been indicated in Figure 3, being arbitrarily positioned to produce a minimum circle of confusion for the largest part of the lens area. With the lens of Figure 3 opened to a radial extent indicated by the reference character 23, the deviation of the curve 22 from the focal plane $f$ is relatively slight, the circle of confusion being relatively small as indicated by the reference character 24 in Figure 3. It will be noted, however, that the curve extends upwardly to the right (over-correction) in the area representing the marginal zone of the lens of Figure 3. Thus when the lens is opened to its fullest extent, as indicated by the reference character 26, the marginal rays fail by a considerable amount to come to a focus in the plane $f$ and produce a relatively large circle of confusion, the maximum diameter of which is indicated by the reference character 28 in Figure 3.

As has been previously pointed out, this marginal area, while relatively small in radial extent, represents a substantial portion of the total light passing through the lens. Thus, if the marginal area of the lens can be made useful by substantially reducing or eliminating the spherical aberration therein, a very substantial improvement in the quality of the lens is produced.

Figure 6:
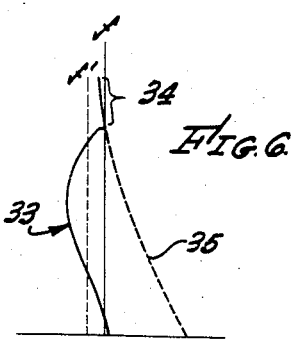
Figure 6 is a curve showing the spherical aberration produced in the composite balanced lens assembly illustrated in Figure 1.

The manner in which the balancing element, incorporated in the lens system in Figure 1 according to my invention, accomplishes the reduction of spherical aberration in the marginal zone is illustrated in Figures 4, 5 and 6. It will be remembered that the characteristic spherical aberration curve for a simple positive lens slopes continually downward to the right (under-correction) and does not re-curve on itself as does the spherical aberration curve for a corrected objective such as shown in Figure 3.

In Figure 4, the reference character 30 indicates the spherical aberration curve for the balancing element 17 illustrated in Figure 1. The dotted portion 31 of the curve shown in Figure 4 represents the curve of spherical aberration which the lens element 17 would have were it not cut out in the central zone as indicated by the character 18.

Figure 5 represents the spherical aberration curve of the conventional portion of the lens shown in Figure 1, an arbitrarily positioned focal plane $f$ being placed thereon to indicate the optimum focal position for the major portion of the lens area.

In Figure 6 is illustrated a spherical aberration curve 33 which results from the combination of the curve 30 in Figure 4 and the curve 32 of Figure 5. It will be noted that the portion 34 of the curve 33 in Figure 6 represents the algebraic sum of the abscissae of the curves 30 and 32.

Thus it will be seen that when the lens system illustrated in Figure 1 is opened to its widest aperture, the curve of spherical aberration deviates but little from the focal plane $f$. In fact, it is possible to relocate the optimum image plane at a position $f'$, indicated by a dotted line in Figure 6, at which the deviation of the curve 33 is less by approximately one-half than the maximum deviation of the curve 32 from the optimum focal plane $f$. Thus the maximum circle of confusion in an image produced by the lens system illustrated in Figure 1 is materially less than the maximum circle of confusion in an image produced by the conventional lens at its widest aperture.

The dotted portion 35 of the curve shown in Figure 6 represents (approximately) the spherical aberration curve that would result if the annular element 17 were solid. Thus it can be seen that the determination of the dimensions of the annular element are derived to a large extent from the spherical aberration curves of the conventional lens and the corrective element respectively. Only such portion of the balancing lens is used as will substantially correct the marginal area of the curve in the conventional lens. It is also necessary, of course, that the central portion of the lens 17 be left open to provide for the optical balance which produces depth of field as described earlier herein.

Figure 7:
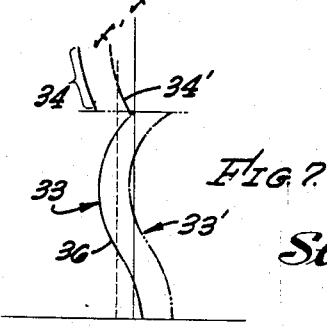
Figure 7 is a diagram similar to Figure 6 showing the effect produced by changing the refractive power of the balancing element in the system shown in Figure 1.

It will be noted from an examination of Figures 4, 5 and 6 that the correction of spherical aberration in the marginal zone, as indicated by the composite curved section 34, is accomplished by reason of the opposite direction of slope of the upper portion of the curve 32 of the conventional lens and of the curve 30 of the balancing element. The effect of combining these two curves is to produce a nearly vertical curve portion 34 as shown in Figure 6. It should be noted further, however, that if the over-all refractive power produced by the correction element 17 and the conventional lens acting in combination, is somewhat greater, or somewhat less than the refractive power of the conventional lens alone, the curve portion 34 will then be displaced forwardly or rearwardly from the principal focal plane of the lens. Such a condition is illustrated in Figure 7, wherein it will be seen that the curved portion 34, shown in full line, is positioned somewhat forwardly of the major portion of the curve 33. This is due to the fact that the focal length of the conventional lens combined with the corrective element is somewhat less than the focal length of the conventional lens alone.

Upon further consideration of Figure 7, it will be noted that a phantom curve 33' having an upper portion 34' is drawn parallel to the full line curve 33, and somewhat to the right thereof. This phantom curve 33' therefore represents the loci of focal points for rays originating in a foreground object and viewed by the composite lens system illustrated in Figure 1. It will be seen that the displacement of the two curves 33 and 33' is such as to bring the upper portion 34' of the latter into the optimum focal plane $f'$ of the principal curve 33. This means then that a sharp focus of background objects will be obtained by the lower portion 36 of the curve 33 whereas the upper portion 34' simultaneously acts to produce sharp images of foreground objects, all of the images thus produced falling close to the optimum focal plane $f'$.

Thus a relatively sharp focus is simultaneously produced for relatively close foreground objects and a relatively distant background, first by making use of two zones of the composite lens having different powers, and secondly, by correcting the marginal zone so as to materially steepen the curve of spherical aberration in order that a substantial length thereof may fall close to the optimum focal plane.

In considering Figures 4, 5, 6 and 7, it should be remembered that the effective area of the marginal zone is considerably greater than is at first apparent, due to the fact that it is the area of the annulus with which we are concerned and not the radius thereof. It should also be pointed out that the relative radial extent of the annular portion is slightly exaggerated in Figures 4, 5, 6 and 7, in order to clearly illustrate the principle involved herein.

From the foregoing discussion it will become apparent that, in correcting spherical aberration, it is the slope of the curve which is important, rather than its displacement from the optimum focal plane. When this slope is made steep and thus more nearly parallel to the optimum focal plane, a much greater zone of the lens is effective on any given object plane. Thus since the slope of the curve is to be corrected, it is important that the corrective effect be applied over the area where this slope deviates most from vertical. Since it is characteristic of even highly corrected photographic objectives that the spherical aberration curve departs radically from the vertical focal plane at the outer margins of the lens, it becomes apparent that corrective effects can be best applied over the marginal area.

As the slope of the curve becomes more and more vertical, however, the corrective effect becomes less and less, in fact, becomes harmful as illustrated by the curve portion 35 in Figure 6.

Accordingly, I have designed the balancing element 17 of my invention so that in every case the internal diameter falls at or near a point where the spherical aberration curve of the conventional lens begins to turn back on itself and thus approaches parallelism to the optimum focal plane. This point is referred to herein as an "inflection point." In most conventional lenses, the shape of the spherical aberration curve is such that an effective annular corrective element intercepts approximately 35% of the light passing through the system.

While the lens system shown and described herein is fully capable of achieving the objects and providing the advantages herein aforestated, it is to be realized that it is illustrative only of the broad principles of the invention and may be modified by those skilled in the art without departing from the spirit of the invention. For this reason I do not mean to be limited to the form shown and described but rather to the scope of the appended claims.

I claim:

1. In combination with a conventional photographic objective corrected for spherical aberration, a corrective element comprising: an annular positive lens having an external diameter approximately equal to the aperture of said conventional objective, an area between 28% and 40% of the said aperture area, and a focal length equal to substantially 1.5 times the focal length of said conventional objective, said corrective element being coaxially positioned within said conventional objective adjacent the optical center theerof, whereby to correct vestigial spherical aberration in the marginal zone of said objective and to materially increase the depth of field thereof.

2. In a photographic objective of the aplanatic type, having a spaced pair of oppositely faced concavo-convex elements therein, and a diaphragm stop in the space between said concavo-convex elements, a corrective element comprising: a plano-convex annular lens coaxially positioned in said space to the rear of said diaphragm stop, said corrective element having a focal length equal to substantially 1.5 times the focal length of said aplanatic objective, having an external diameter equal to approximately the maximum diameter of said diaphragm stop, and having a cross-sectional area between 28% and 40% of said maximum aperture area whereby to correct for vestigial spherical aberration in the marginal area of said aplanatic objective and to modify the focal length of said marginal area whereby to increase the depth of field of said objective.

3. In combination with a conventional photographic objective corrected for spherical aberration, a corrective element comprising: an annular positive lens having an external diameter approximately equal to the aperture of said conventional objective, an area between 28% and 40% of the said aperture area, and a focal length equal to substantially 1.5 times the focal length of said conventional objective, said corrective element being coaxially positioned with respect to said conventional objective adjacent the optical center thereof, whereby to correct vestigial spherical aberration in the marginal zone of said objective and to materially increase the depth of field thereof.

4. In combination with a conventional photographic objective corrected for spherical aberration, a corrective element comprising: an annular lens having non-parallel optical surfaces, at least one of which is spherical, an external diameter approximately equal to the aperture of said conventional objective, an area between 28% and 40% of said aperture area, and a focal length equal to substantially 1.5 times the focal length of said conventional objective, said corrective element being coaxially positioned with respect to said conventional objective adjacent the optical center thereof whereby to correct vestigial spherical aberration in the marginal zone of said objective and to materially increase the depth of field thereof.

5. In combination with a conventional photographic objective corrected for spherical aberration, a corrective element comprising: an annular positive lens having an external diameter approximately equal to the aperture of said conventional objective, an area between 28% and 40% of the said aperture area, and a focal length such that the composite focal length of said conventional objective and said annular lens differs substantially from that of said conventional objective alone, said corrective element being coaxially positioned with respect to said conventional objective adjacent the optical center thereof, whereby to correct vestigial spherical aberration in the marginal zone of said objective and to materially increase the depth of field thereof.

6. In combination with a conventional photographic objective corrected for spherical aberration, a corrective element comprising: an annular lens having non-parallel optical sufaces, at least one of which is spherical, an external diameter approximately equal to the aperture of said conventional objective, an area between 28% and 40% of the said aperture area, and a focal length such that the composite focal length of said conventional objective and said annular lens differs substantially from that of said conventional objective alone, said corrective element being coaxially positioned with respect to said conventional objective adjacent the optical center thereof, whereby to correct vestigial spherical aberration in the marginal zone of said objective and to materially increase the depth of field thereof.

STEPHEN E. GARUTSO.

References Cited in the file of this patent

UNITED STATES PATENTS

| Number | Name | Date |
|---|---|---|
| 583,336 | Rudolph | May 25, 1897 |
| 2,117,252 | Lee | May 10, 1938 |
| 2,194,413 | Warmisham et al. | Mar. 19, 1940 |

FOREIGN PATENTS

| Number | Country | Date |
|---|---|---|
| 373,755 | Germany | Apr. 16, 1923 |
| 193,969 | Great Britain | Mar. 2, 1923 |
| 622,100 | France | Feb. 19, 1927 |
| 335,696 | Great Britain | Oct. 2, 1930 |